US008224866B2

(12) United States Patent
Boss et al.

(10) Patent No.: US 8,224,866 B2
(45) Date of Patent: *Jul. 17, 2012

(54) IDEA TRACKING AND MANAGEMENT

(75) Inventors: Gregory J. Boss, American Fork, UT (US); Rick A. Hamilton, Charlottesville, VA (US); Kevin C. McConnell, Austin, TX (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/090,124

(22) Filed: Apr. 19, 2011

(65) Prior Publication Data

US 2011/0196713 A1 Aug. 11, 2011

Related U.S. Application Data

(63) Continuation of application No. 12/139,030, filed on Jun. 13, 2008, now Pat. No. 8,041,696.

(51) Int. Cl.
*G06F 17/30* (2006.01)

(52) U.S. Cl. ........................................ 707/802

(58) Field of Classification Search .................. 707/705, 707/802, E17.031, E17.034, E17.039
See application file for complete search history.

(56) References Cited

U.S. PATENT DOCUMENTS

| 5,999,907 | A | 12/1999 | Donner |
| 6,154,725 | A | 11/2000 | Donner |
| 6,308,164 | B1 | 10/2001 | Nummelin et al. |
| 6,556,992 | B1 | 4/2003 | Barney et al. |
| 7,089,192 | B2 | 8/2006 | Bracchitta et al. |
| 7,194,691 | B1* | 3/2007 | Zilka et al. .................. 715/739 |
| 7,386,460 | B1 | 6/2008 | Frank et al. |
| 7,493,262 | B2 | 2/2009 | Hagelin |
| 7,516,137 | B1 | 4/2009 | Earle et al. |
| 2003/0036947 | A1* | 2/2003 | Smith et al. .................. 705/10 |
| 2005/0149401 | A1 | 7/2005 | Ratcliffe et al. |
| 2005/0154673 | A1 | 7/2005 | Fellenstein et al. |
| 2006/0031092 | A1 | 2/2006 | Cronin |
| 2008/0243889 | A1 | 10/2008 | Chen et al. |
| 2010/0332285 | A1 | 12/2010 | Dunagan et al. |
| 2011/0010309 | A1 | 1/2011 | Dunagan et al. |

FOREIGN PATENT DOCUMENTS

WO WO 0102987 A2 1/2001

OTHER PUBLICATIONS

Business Insights Workbench, International Business Machines Corporation [online], [retrieved on May 18, 2009]. Retrieved from the Internet using <URL: http://www.almaden.ibm.com/asr/projects/biw/biw-index.shtml>.
WebRegMT Overview, European Patent Register [online], [retrieved on May 18, 2009]. Retrieved from the Internet Archive Wayback Machine using <URL: http://web.archive.org> and <URL: http://web.archive.org/web/*/http://docs.epoline.org/doc/epoline/myepoline/en/WebRegMT_Help_EN.htm>.

* cited by examiner

*Primary Examiner* — Fred I Ehichioya
(74) *Attorney, Agent, or Firm* — Cahn & Samuels, LLP

(57) ABSTRACT

Disclosure is related to idea tracking and management. The disclosure invokes a method and system for displaying and tracking ideas from a database. The invention accesses a data repository via a data connection, displays the data from the data repository, and allows the displayed data to be characterized as scheduling data, statistical data, action items, current status, and listing of individuals.

18 Claims, 20 Drawing Sheets

| Disclosure Name | Percent | Average Time in Months | Inventors |
|---|---|---|---|
| ▼ 2006 | 11% | 3.1 | |
| ▶ Regular Inventors (9) | 75% | 3.3 | |
| ▼ Under Evaluation (2) | 22% | 0.0 | |
| | | 3.6 Months | Dmitry<br>Galina<br>Gregory |
| | | 4.9 Months | Soobaek<br>Michael<br>Joshua<br>Alex<br>Dimitri |
| ▶ Search (3) | 33% | 2.8 | |
| ▶ File (1) | 11% | 5.3 | |
| ▶ Close (3) | 33% | 3.1 | |
| ▼ Brian (1) | 8% | 2.1 | |
| ▼ Search (1) | 100% | 2.1 | |
| | | 2.1 Months | Brian<br>Frank<br>Darren |
| ▶ Joe (1) | 8% | 4.0 | |
| ▶ Kevin (1) | 8% | 1.8 | |
| ▶ 2005 | 38% | 5.0 | |
| ▶ 2004 | 36% | 9.5 | |
| ▶ 2003 | 9% | 5.2 | |
| ▶ 2002 | 6% | 1.8 | |

FIG. 13

Patent Tracker

| Ideas & Disclosures | Ref # ^ | Priority | IDT Target | Percent |
|---|---|---|---|---|
| Action Items | | | | |
| Action Items | * ▸ Steve | | | 0.1% |
| Inventors | * ▸ Sudhir | | | 0.1% |
| Inventors | * ▸ Tim | | | 0.3% |
| Number of Inventors | * ▸ Tim | | | 0.1% |
| Status | * ▸ Timothy | | | 0.1% |
| All Disclosures | ▸ Timothy | | | 7.0% |
| Payment | * ▾ CHQ YOR Derek | | −180 (8) | 10.8% |
| Planning | * ▸ File (2) | | | 62.5% |
| by IDT-Date | * ▸ Publish (1) | | | 25.0% |
| by Date-IDT | * ▾ Close (9) | | | 12.5% |
| 2 Inventors-Date-IDT | * ▾ GS AUS David | | −93F (38) | 47.3% |
| 3 Inventors-Date-IDT | * ▸ Search (1) | | | 2.9% |
| 4 Inventors-Date-IDT | * ▸ File (30) | | | 77.1% |
| Statistics | * ▾ File/Merge (1) | | | 2.9% |
| CIO-by Date & Executive | * ▸ Publish (6) | | | 17.1% |
| CIO-by Date & Stage | * ▾ GS AUS Justin | | −93F (3) | 4.1% |
| CIO-by Date & Evaluator | * ▾ GS END Derek | | −180 (2) | 2.7% |
| CIO-by Evaluators and D | * ▾ GS END William | | −79 (26) | 35.1% |
| CIO-by Iniative | * ▸ Timur | | | 0.1% |
| CIO-by Topic | * ▸ Venkat | | | 0.1% |
| Disclosure-by IDT | * ▸ Vincent | | | 0.3% |
| Disclosure-by Person & | * ▸ Warren | | | 0.1% |
| Disclosure-by Date & ID | * ▸ Wee | | | 0.1% |
| Outside Counsel-by Firm | | | | |
| Outside Counsel-by Atto | | | | |

| Ref # ^ | Priority | Percent | Disclosure Name | Roles |
|---|---|---|---|---|
| John | | 0.6% | | |
| Keith | | 6.1% | | |
| Kevin | | 2.8% | | |
| Kulvir | | 4.4% | | |
| Lara | | 0.6% | | |
| Maura | | 1.1% | | |
| Michael | | 1.1% | | |
| Moni | | 0.6% | | |
| Neil | | 0.6% | | |
| Peter | | 5.0% | | |
| Philip | | 0.6% | | |
| Rick | | 21.1% | | |
| ▼ AIM BOC Jean | - SWG14 | 2.6% | | |
| ▼ CHQ YOR Derek | - | 5.3% | | |
| ▼ GS AUS David | - 93 (26) | 63.2% | | |
| ▼ GS AUS David | - 94 (4) | 10.5% | | |
| ▼ GS END William | - 79 | 10.5% | | |
| ▼ GS END William | ** | 5.3% | | |
| ▼ SDG BOC Jean | - 00A (1) | 2.6% | | |
| Stephen | | 0.6% | | |
| Timothy | | 0.6% | | |
| Timothy | | 3.9% | | |
| Vincent | | 0.6% | | |

Patent Tracker
- Ideas & Disclosures
- Action Items
  - Action Items
- Inventors
  - Inventors
  - Number of Inventors
- Status
  - All Disclosures
  - Payment
- Planning
  - by IDT-Date
  - by Date-IDT
  - 2 Inventors-Date-IDT
  - 3 Inventors-Date-IDT
  - 4 Inventors-Date-IDT
- Statistics
  - CIO-by Date & Executive
  - CIO-by Date & Stage
  - CIO-by Date & Evaluator
  - CIO-by Evaluators and D
  - CIO-by Iniative
  - CIO-by Topic
  - Disclosure-by IDT
  - Disclosure-by Person &
  - Disclosure-by Date & ID
  - Outside Counsel-by Firm
  - Outside Counsel-by Atto

Patent Tracker

| Ideas & Disclosures | Ref # ^ | USPTO/WPTS # ^ | Combined Score | Competency Score | Expediency Score | % os Work Assigned | Disclosure Na |
|---|---|---|---|---|---|---|---|
| Action Items | | | | | | | |
| Action Items | * | (2) | 50% | 100% | 100% | 1.4% | |
| Inventors | | | | | | | |
| Inventors | * | (1) | 88% | 75% | 100% | 0.7% | |
| Number of Inventors | * | TMW202 YOR9-YOR8- (1) | 88% | 75% | 100% | 100.0% | System and M Printing Enha |
| Status | | | | | | | |
| All Disclosures | * | (1) | 100% | 100% | 100% | 0.7% | |
| Payment | * | (1) | 38% | 75% | 0% | 0.7% | |
| Planning | | | | | | | |
| by IDT-Date | * | | 75% | 75% | 75% | 0.7% | |
| by Date-IDT | * | | 39% | 88% | 69% | 5.8% | |
| 2 Inventors-Date-IDT | * | (1) | 43% | 94% | 56% | 5.0% | |
| 3 Inventors-Date-IDT | * | | 25% | 50% | 0% | 0.7% | |
| 4 Inventors-Date-IDT | * | (2) | 88% | 100% | 75% | 1.4% | |
| Statistics | * | (7) | 32% | 83% | 67% | 5.0% | |
| * Not Specified | * | | 3% | 94% | 63% | 77.7% | |
| CIO-by Date & Executive | | | 13% | 88% | 64% | 100.0% | |
| CIO-by Date & Stage | | | | | | | |
| CIO-by Date & Evaluator | | | | | | | |
| CIO-by Evaluators and D | | | | | | | |
| CIO-by Initiative | | | | | | | |
| CIO-by Topic | | | | | | | |
| Disclosure-by IDT | | | | | | | |
| Disclosure-by Person & | | | | | | | |
| Disclosure-by Date & ID | | | | | | | |
| Outside Counsel-by Firm | | | | | | | |
| Outside Counsel-by Atto | | | | | | | |

FIG. 16

| | | Ref # | USPTO/WPTS # | Combined Score | Competency Score | Expediency Score | % os Work Assigned | Disclosure Na |
|---|---|---|---|---|---|---|---|---|
| Action Items | | | | | | | | |
| Action Items | * | | | 38% | 88% | 63% | 2.9% | |
| Inventors | | | | | | | | |
| Inventors | * | * | | 0% | 0% | 0% | 0.7% | |
| Number of Inventors | * | * | | 88% | 75% | 100% | 0.7% | |
| Status | | | | | | | | |
| All Disclosures | * | * | | 75% | 100% | 50% | 0.7% | |
| Payment | * | * | | 0% | 0% | 0% | 0.7% | |
| Planning | | | | | | | | |
| by IDT-Date | * | * | | 0% | 0% | 0% | 0.7% | |
| by Date-IDT | * | * | | 75% | 100% | 50% | 0.7% | |
| 2 Inventors-Date-IDT | * | * | | 63% | 100% | 25% | 5.0% | |
| 3 Inventors-Date-IDT | * | * | | 0% | 0% | 0% | 2.9% | |
| 4 Inventors-Date-IDT | * | * | | 38% | 75% | 0% | 0.7% | |
| Statistics | | | | | | | | |
| CIO-by Date & Executive | * | * | | 75% | 75% | 75% | 0.7% | |
| CIO-by Date & Stage | * | * | | 25% | 50% | 0% | 0.7% | |
| CIO-by Date & Evaluator | * | * | | 75% | 100% | 50% | 0.7% | |
| CIO-by Evaluators and D | * | * | | 88% | 75% | 100% | 0.7% | |
| CIO-by Iniative | * | * | | 63% | 75% | 50% | 0.7% | |
| CIO-by Topic | * | * | | 100% | 100% | 100% | 0.7% | |
| Disclosure-by IDT | * | * | | 50% | 75% | 25% | 0.7% | |
| Disclosure-by Person & | * | * | | 0% | 0% | 0% | 0.7% | |
| Disclosure-by Date & ID | * | * | | 50% | 88% | 63% | 2.2% | |
| Outside Counsel-by Firm | * | * | | 88% | 100% | 75% | 1.4% | |
| Outside Counsel-by Atto | * | * | | 44% | 100% | 75% | 1.4% | |

FIG. 17

Disclosure

General Information

Disclosure Title:
Inventors: Rick /Charlottesville/IBM,
Greg /Armonk/IBM, Brian
/Southbury/IBM, Keith
/Austin/IBM IDT: GS AUS: 93F
Target: ☐ Hard Target
IDT Review Date: 08/02/2006

Prioritization:

File Likelihood:
○ 1 - High
◉ 2 -
○ 3 - Medium
○ 4 -
○ 5 - Low

Readiness:
○ 1 - Final Draft
○ 2 - 1st Draft
○ 3 - In Progress
○ 4 - eMail writeup
◉ 5 - Idea Only Key Words:

Action Items

Action Items:
Action Item Owner:
Action Item Due Date:
Ask Counsel about Docket Split potential?: No

Status

Disclosure Status: Abandoned
Not yet coded

Payment:

Roles

Initial Writeup:
Verbal Defense:
Prior Art:
Outside Counsel:

References

Internal Reference: RAH603
WPTS Doc Link:
Disclosure Number:
Docket Number:
USPTO Number:

Executive Summary

Summary:
Two - Five sentences on the fore idea

Notes: ☐ Mark for Review

FIG. 18

IDEA TRACKING AND MANAGEMENT

This patent application is a continuation application of U.S. patent application Ser. No. 12/139,030 filed on Jun. 13, 2008, which is hereby incorporated by reference.

FIELD OF THE INVENTION

The disclosure relates to a method and system for tracking ideas. More specifically, the disclosure accesses data from a data repository, displays the data as scheduling data, statistical data, action item(s), listing of individuals, and current status.

BACKGROUND

U.S. Pat. No. 5,999,907 discloses an intellectual property computer-implemented audit system for valuing an intellectual property portfolio includes a first database storing first information relating to the intellectual property portfolio and a database access and collection device connected to the first database and accessing the first database and retrieving the first information. In addition, the intellectual property audit system also includes a second database storing empirical data relating to known intellectual property portfolios, and a comparison device connected to the database access and collection device and to the second database, the comparison device receiving the first information from the database access and collection device and comparing the first information to the empirical data retrieved from the second database producing an intellectual property worth indicator indicating the worth of the intellectual property portfolio.

U.S. Pat. No. 6,154,725 discloses an intellectual property (IP) computer-implemented audit system estimates a value of an intellectual property portfolio. The IP computer-implemented audit system includes a computer program product storing instructions to be implemented by a computer. The IP audit system includes a first database storing first information relating to the intellectual property portfolio, and a database access and collection device accessing and retrieving the first information. The IP audit system also includes a second database storing empirical data relating to known IP portfolios, and a comparison device comparing the first information to the empirical data retrieved from the second database producing an IP worth indicator indicating the worth of the IP portfolio. The IP audit system is optionally implementable over a network architecture.

U.S. Pat. No. 6,308,164 discloses an enterprise project management system includes a system for creating new projects and adding project tasks and resources to the system. Information used to create the projects, project tasks and resources is input at a workstation that may or may not be connected to the enterprise network. The information used to create projects, project tasks and resources includes primary and secondary information. The primary information is essential to the project management system for storing the project, project task and resource and for creating or modifying the project schedules. The secondary information is categorization or classification information useful for reporting and not essential to the scheduling function of the system. The secondary information fields are validated by comparing at least some of them with a set of predefined valid values for each field.

U.S. Pat. No. 6,556,992 discloses a statistical patent rating method and system is provided for independently assessing the relative breadth ("B"), defensibility ("D") and commercial relevance ("R") of individual patent assets and other intangible intellectual property assets. The invention can be used by patent valuation experts, investment advisors, economists and others to help guide future patent investment decisions, licensing programs, patent appraisals, tax valuations, transfer pricing, economic forecasting and planning, and even mediation and/or settlement of patent litigation lawsuits. In one embodiment this prior art provides a statistically-based patent rating method and system whereby relative ratings or rankings are generated using a database of patent information by identifying and comparing various characteristics of each individual patent to a statistically determined distribution of the same characteristics within a given patent population.

U.S. Pat. No. 7,089,192 discloses an intellectual property management facility for proactively creating, developing and managing an intellectual property portfolio includes: determining available resource capacity for an intellectual property activity in a tracking system; assigning technical attributes to the activity in the tracking system; apportioning resource capacity for the activity by technical attribute based on the value assigned to each of the technical attributes and based on available resource capacity; obtaining actual resource usage by technical attribute from the tracking system; and managing resource allocation for the intellectual property activity by determining the difference between the actual resource usage and the resource allocation by technical attribute.

U.S. Patent Application 2005\0149401 discloses a system and method for providing an intellectual property collaboration network for the development and improvement of inventions and technology with inventors being granted equity or an ownership interest in patent arrays or companies which patent, market, license and generate revenue from the developed technology. The prior art provides a way of distributing equity to contributing inventors of ideas and owners of patents within the network for those technologies which are grouped and related. The prior art enables inventors to submit ideas, collaborate on projects, advance technology and protect inventions through an intellectual property network which provides inventors equity in companies or patent arrays in exchange for the developments which are then patented, marketed, and licensed with revenue flowing through the companies and patent arrays back to the inventors and other contributors of the system. The system may also be used for existing and donated patents which can be marketed and licensed through the system including granting equity or ownership interest in the patent arrays or companies to owners of the existing or donated patents.

U.S. Patent Application 2005/0154673 discloses a method for monitoring payments, payment authorizations, and payable events in an inventor recognition program for a company. The prior art comprises an Award Reminder Program (ARP), an Award Status Program (ASP), and an Award Monitoring Program (AMP). The ARP monitors the award tracking database associated with the present invention and sends the inventor's manager an email requesting authorization of payment when required. If the manager does not authorize payment, the ARP sends the manager a reminder email. If the manager still does not authorize payment, the ARP proceeds up the company's organizational chart until payment is authorized. The ASP monitors the award tracking database and updates the status of each docket in the award tracking database. The AMP allows a user to view the award tracking database, print a payment report, print a payable events report, or send a reminder email to the inventor's manager.

U.S. Patent Application 2006\0031092 discloses a method and system for recording and tracking the progress of a plurality of inventions through an Invention Method including IP Mapping, IP Strategy, IP Generation, IP Documentation, IP Review Board, and IP Patenting or Provisional Filing, utilizing a Database platform comprising a plurality of tables, view screens, and reports that characterize the flow of an invention from one method through to the next, from the time an invention is identified until it is patented, and even beyond issuance, or until some other disposition of the invention is made.

WIPO Patent Application Wo0102987A2 discloses a system and method provide a web-based infomediary for dissemination of intellectual property transfer information among multiple users via a global computer network such as the World Wide Web. The system and method can be used to provide network users with information to facilitate transfer of intellectual property rights by assignment or license. Also, the system and method can be configured to collect bids and offers from parties seeking to acquire rights, or conduct a web-based auction. In this manner, the system and method provide a web-based infomediary in the sense that they facilitate person-to-person or business-to-business online exchanges that leverage the Internet to unite buyers and sellers into a single, efficient virtual marketplace that provides a concentration of pertinent information.

Biw-core is related to information analytics tools, and methodologies involving those tools, for assisting in finding the insights in information by eliciting and capturing domain knowledge as part of the mining process.

WebRegMT is a monitoring tool to help users keep track of status changes in selected patents or applications. Epoline® is the name given to the range of online products and services designed by the European Patent Office (EPO) to allow patent applicants, attorneys and other users to conduct their business with the EPO electronically in a state-of-the-art secure environment, protected by smart card or username/password access.

SUMMARY OF THE INVENTION

The illustrative embodiments described herein provide a computer implemented method, system, and computer usable program product for displaying information from a database.

An exemplary feature of an embodiment is a method for displaying information from a database. This method consists of accessing a data repository via a data connection, displaying data accessed from the data repository, and allowing said displayed data to be characterized as scheduling and statistical data.

A further exemplary feature of an embodiment is a method that displays data further characterized as an action item.

Another exemplary feature of an embodiment is a method that displays data further characterized as a current status.

Yet another exemplary feature of an embodiment is a method which displays data as a listing of individuals Another exemplary feature of an embodiment is a method which displays the scheduling data to be further characterized as a listing of reviewers.

A further exemplary feature of an embodiment is a method which displays the scheduling data to be further characterized as a date.

Yet another exemplary feature of an embodiment is a method which further displays the statistical data as a responsible executive.

Another exemplary feature of an embodiment is a method of displaying statistical data as a date.

Yet another exemplary feature of an embodiment is a method of displaying statistical data to be further characterized an initiative.

Another exemplary feature of an embodiment is a method of displaying statistical data to be further characterized a topic.

Yet another exemplary feature of an embodiment is a method of displaying statistical data to be further characterized as a stage.

Another exemplary feature is a method of displaying statistical data as a listing of individuals to be further characterized as a submission.

Yet another exemplary feature is a method of displaying statistical data to be further characterized as a listing of reviewers.

Another exemplary feature is a method of displaying data to be further characterized as an owner of an action item.

Yet another exemplary feature is a method of displaying data to be further characterized as an assignment of an action item.

Another exemplary feature is a method of displaying data to be further characterized as a due date of an action item.

Yet another exemplary feature is a method of displaying current status data to be further characterized as a stage.

Another exemplary feature is a method of displaying a listing of individuals to be further characterized as a number of individual group members.

Still another exemplary feature is a method of displaying listing of individuals to be further characterized as an abstraction submission.

Various other features, exemplary features, and attendant advantages of the present disclosure will become more fully appreciated as the same becomes better understood when considered in conjunction with the accompanying drawings, in which like reference characters designate the same or similar parts throughout the several views.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 illustrates a comprehensive view of inventor ideas according to an embodiment of the present invention.

FIG. 5 illustrates a provision of payment status, as well as identification of state duration according to an embodiment of the invention.

FIG. 6 illustrates planning features from a perspective of review board dates according to an embodiment of the invention.

FIG. 10 illustrates a provision of statistics for a given review board according to an embodiment of the invention.

FIG. 13 illustrates a provision of statistics by IDT according to an embodiment of the invention.

FIG. 14 illustrates a provision of statistics by person and IDT according to an embodiment of the invention.

FIG. 15 illustrates a provision of disclosures by date and IDT, for each inventor according to an embodiment of the invention.

FIG. 16 illustrates a provision of an outside counsel rating system by Firm according to an embodiment of the invention.

FIG. 17 illustrates a provision of an outside counsel rating system by individual counsel according to an embodiment of the invention.

FIG. 18 illustrates the submission of data according to an embodiment of the invention.

DETAILED DESCRIPTION

Within the current business climate there is a voracious demand to aid with the development of ideas. This demand includes the ability to track such ideas as they move from conception into well-rounded invention disclosures and beyond.

This need increases as the number of ideas under consideration and development increase in quantity. According to an embodiment of the disclosure, the invention's functionality automates many actions associated with managing ideas. These attributes significantly aid inventors, scientists, and other professions with the ability efficiently manage their ideas and thoughts.

Figure 1:
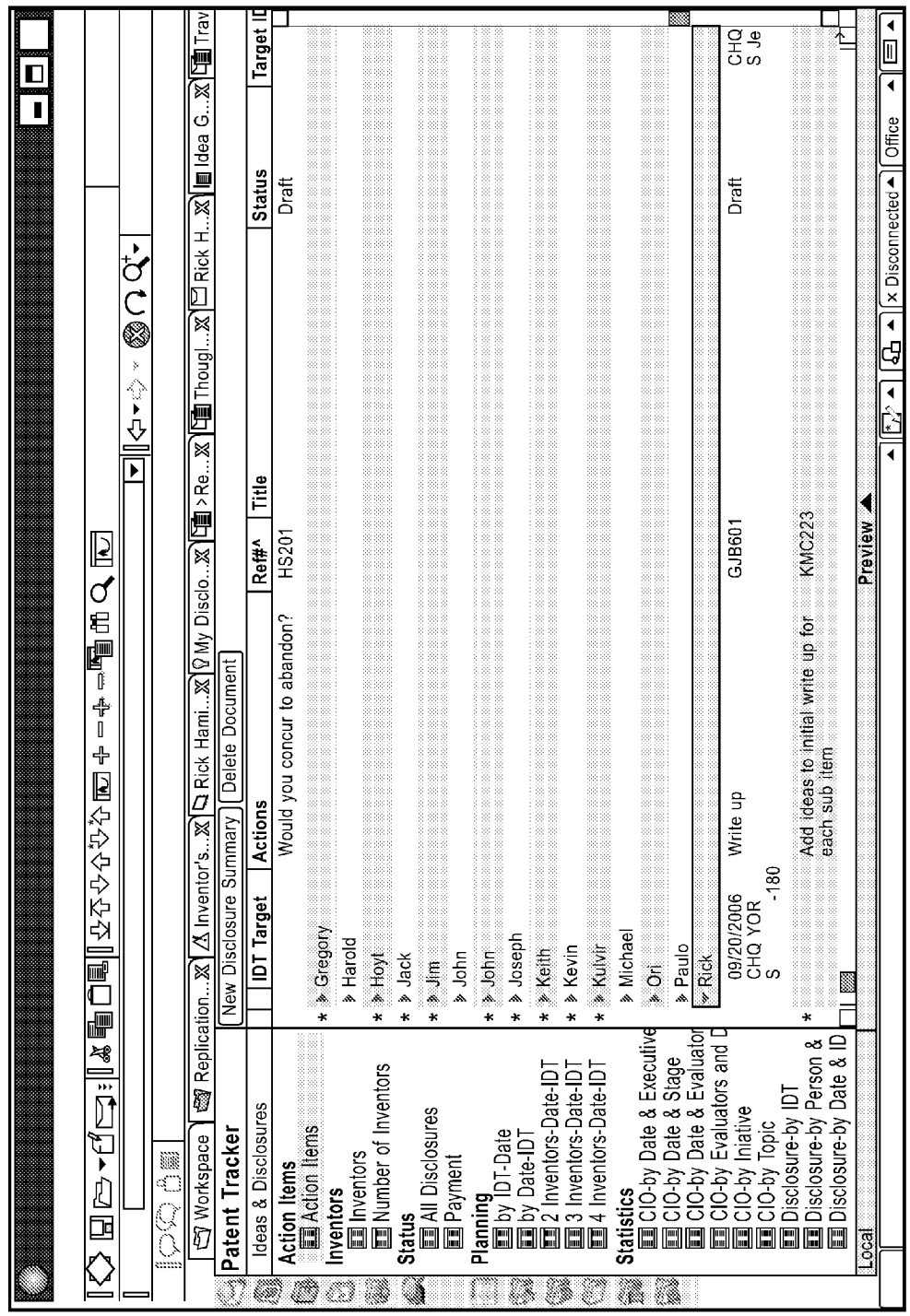
FIG. 1 illustrates assignment of inventor action items according to an embodiment of the invention.

FIG. 1 illustrates assignment of inventor action items. This embodiment of the invention permits inventors to assign action items to themselves or each other, along with the inclusion of an optional due date for completion. This embodiment allows the assigned action items to then be viewed and displayed by an end-user.

Figure 2:
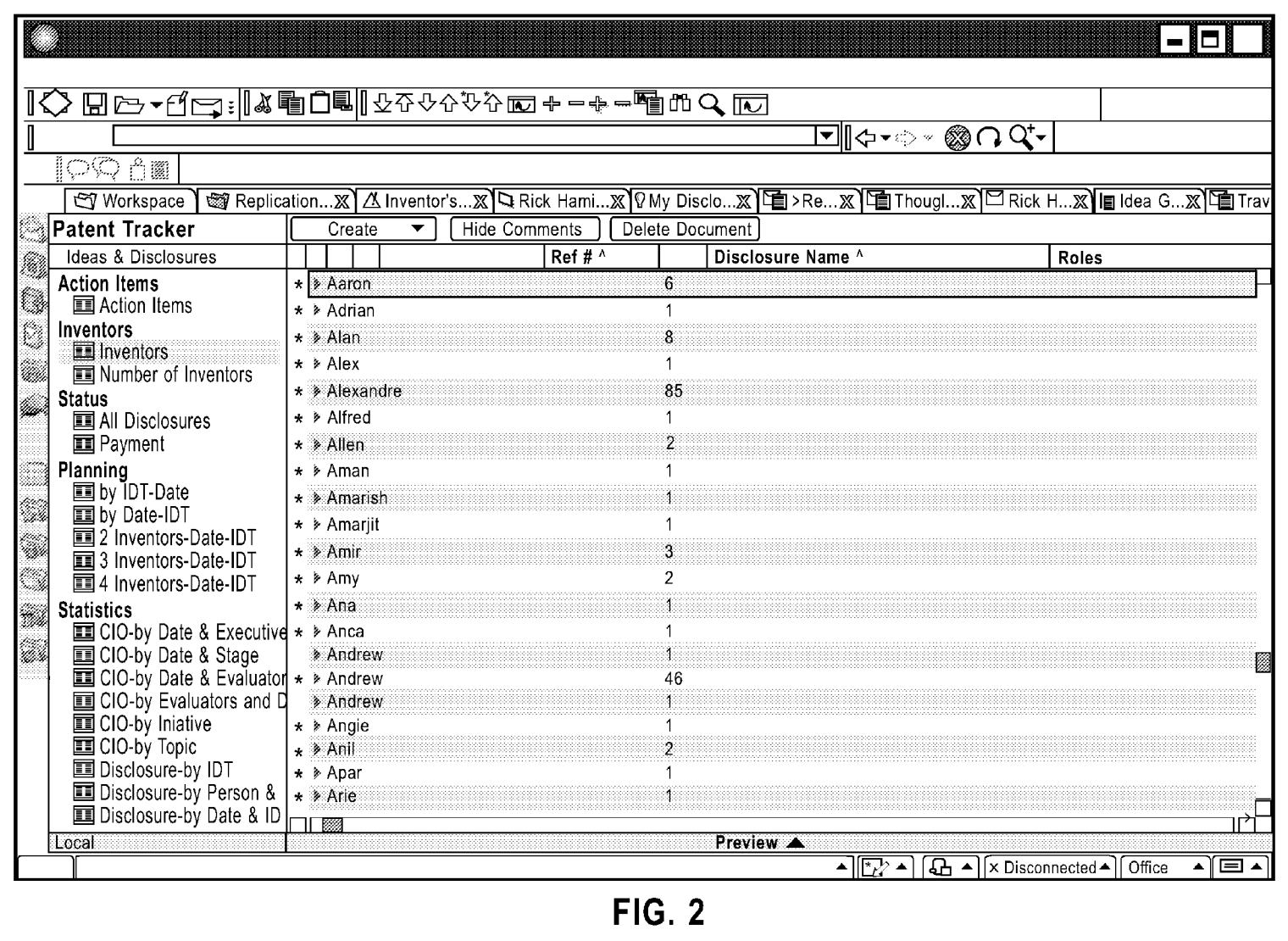

FIG. 2 illustrates a comprehensive view of inventor ideas. This embodiment of the invention illustrates how the displayed data can be characterized as a listing of individuals. Such individuals include those who submit ideas and thoughts into the system. An inventor can view all ideas they have, along with the status of each submission. This embodiment of the invention further allows the listing of individuals to be further characterized as an abstraction or listing of abstractions including any idea or thought submitted into the system.

Inventors and other end-users can submit inventive ideas, thoughts, or comments at the earliest point in the process. Such a start includes from the point when the inventor has an inception and or conception. This idea can include an thought and is not limited to ideas that result in invention disclosures. Furthermore, ideas and thoughts can then be ranked and sorted by inventors to assist with the further development of those ideas and thoughts into invention disclosures. A comprehensive view of inventive ideas allows the documentation process of inventor ideas and comments to start from when the idea is created through the entire process.

Figure 3:
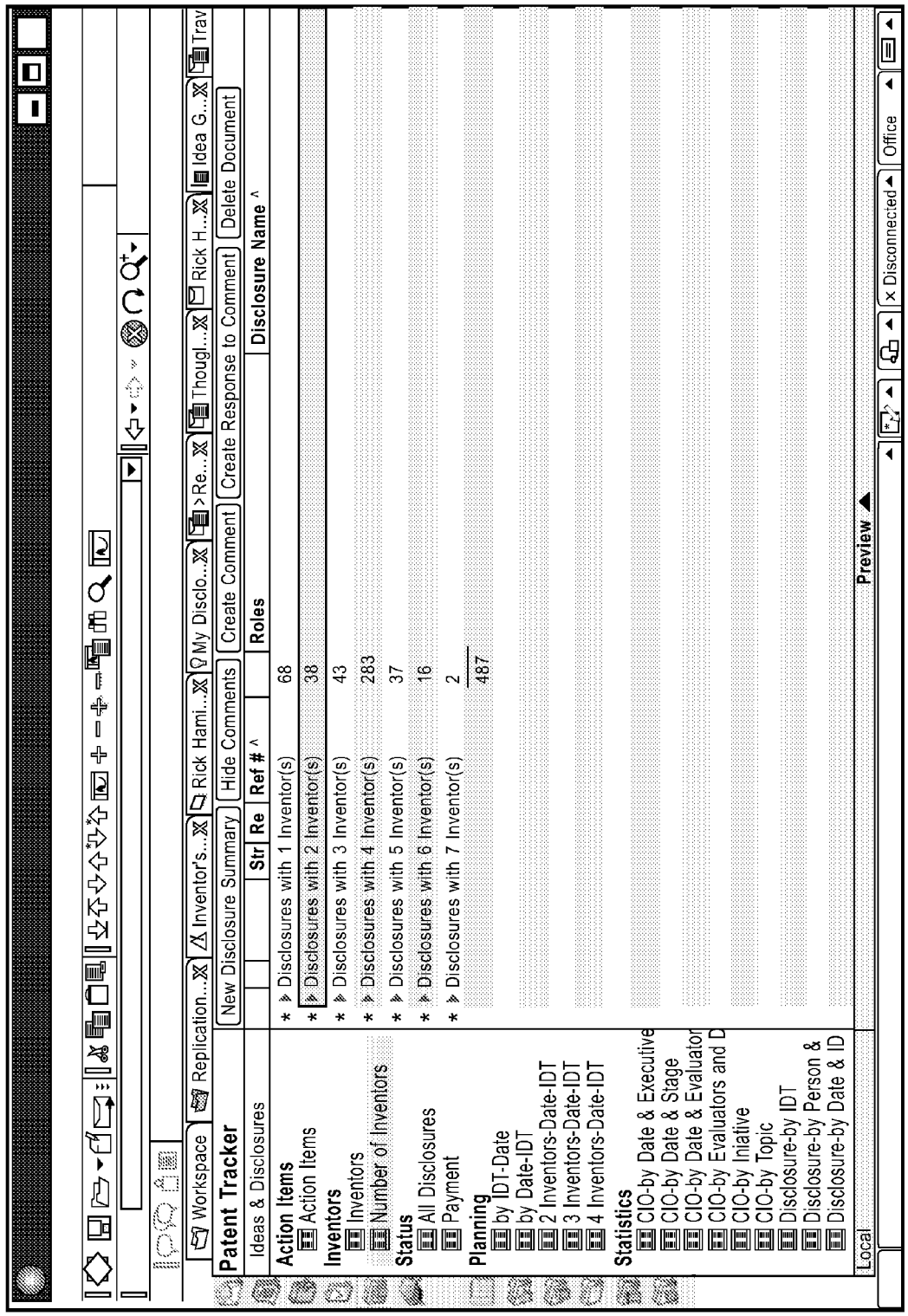
FIG. 3 illustrates a division of ideas by number of inventors according to an embodiment of the invention.

FIG. 3 illustrates a division of Ideas by number of inventors. This embodiment of the invention allows the displayed data to be further characterized as a number of individual group members of a submission. This embodiment provides the inventor with quick information about the relative inventor or scientific population on ideas as they are being developed.

Furthermore, this embodiment of the invention allows administrators, managers, or inventors to view disclosures based on the number of inventors on a given disclosure that have a single, co-inventor, and more than 3, or 4. This embodiment facilitates the ability to find ideas that can use more expertise from other subject matter inventors. As a result, this embodiment of the invention facilitates contributions from other inventors that are not working on the disclosure. Furthermore, this embodiment of the invention can provide alerts and status to users of specific actions. As a result, this embodiment of the invention allows inventors to refocus and solicit contribution from other inventors.

Figure 4:
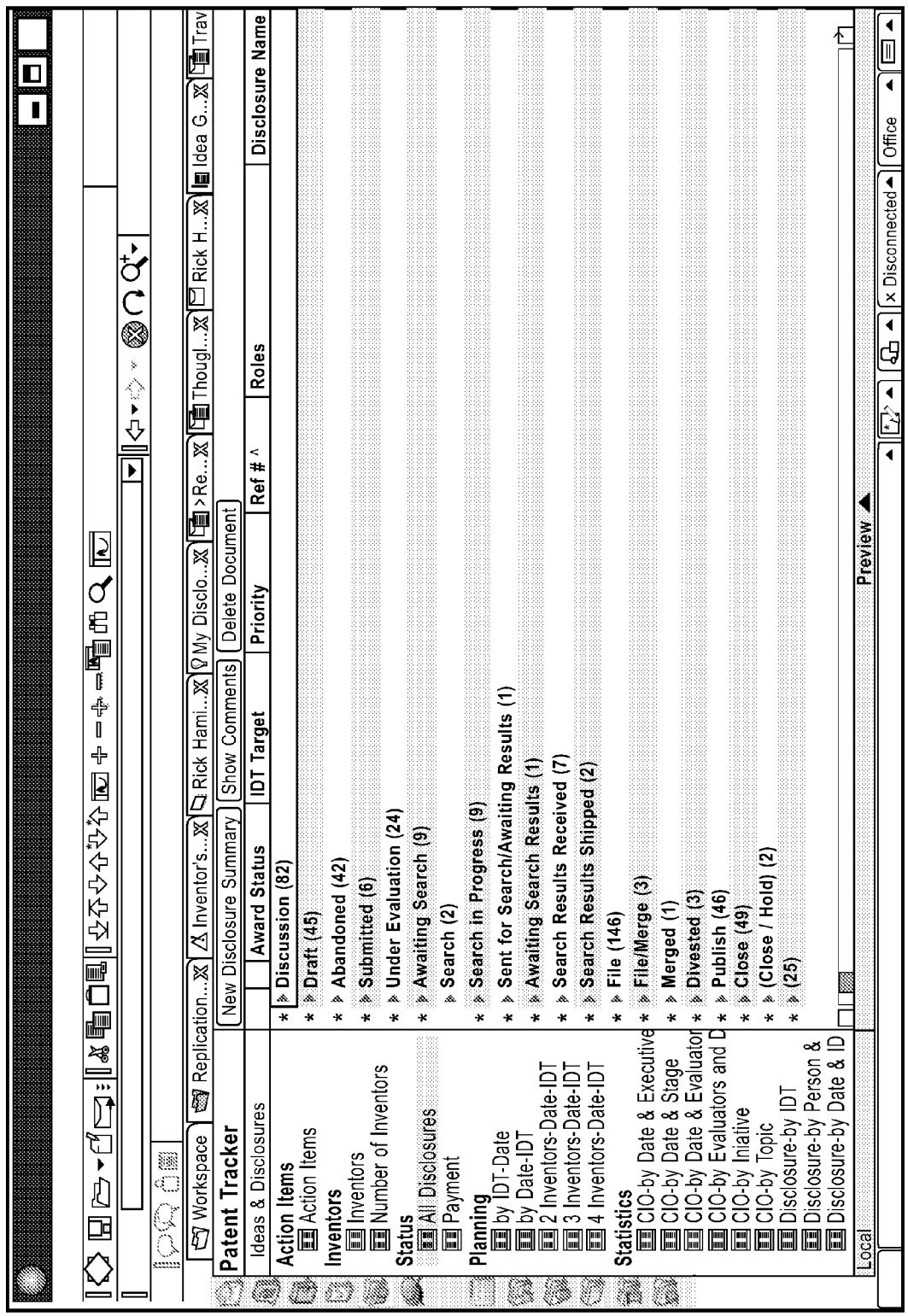
FIG. 4 illustrates a comprehensive provision of disclosure status according to an embodiment of the invention.

FIG. 4 illustrates a comprehensive provision of disclosure status. This embodiment of the invention allows the displayed data to be characterized as duration of the current status of a disclosure or submission into the system. This embodiment permits the user to see at a quick glance where each disclosure stands. An embodiment of the invention can further include a granular view, giving the user the ability to see comments on ideas before a draft disclosure is even begun.

Figure 5:
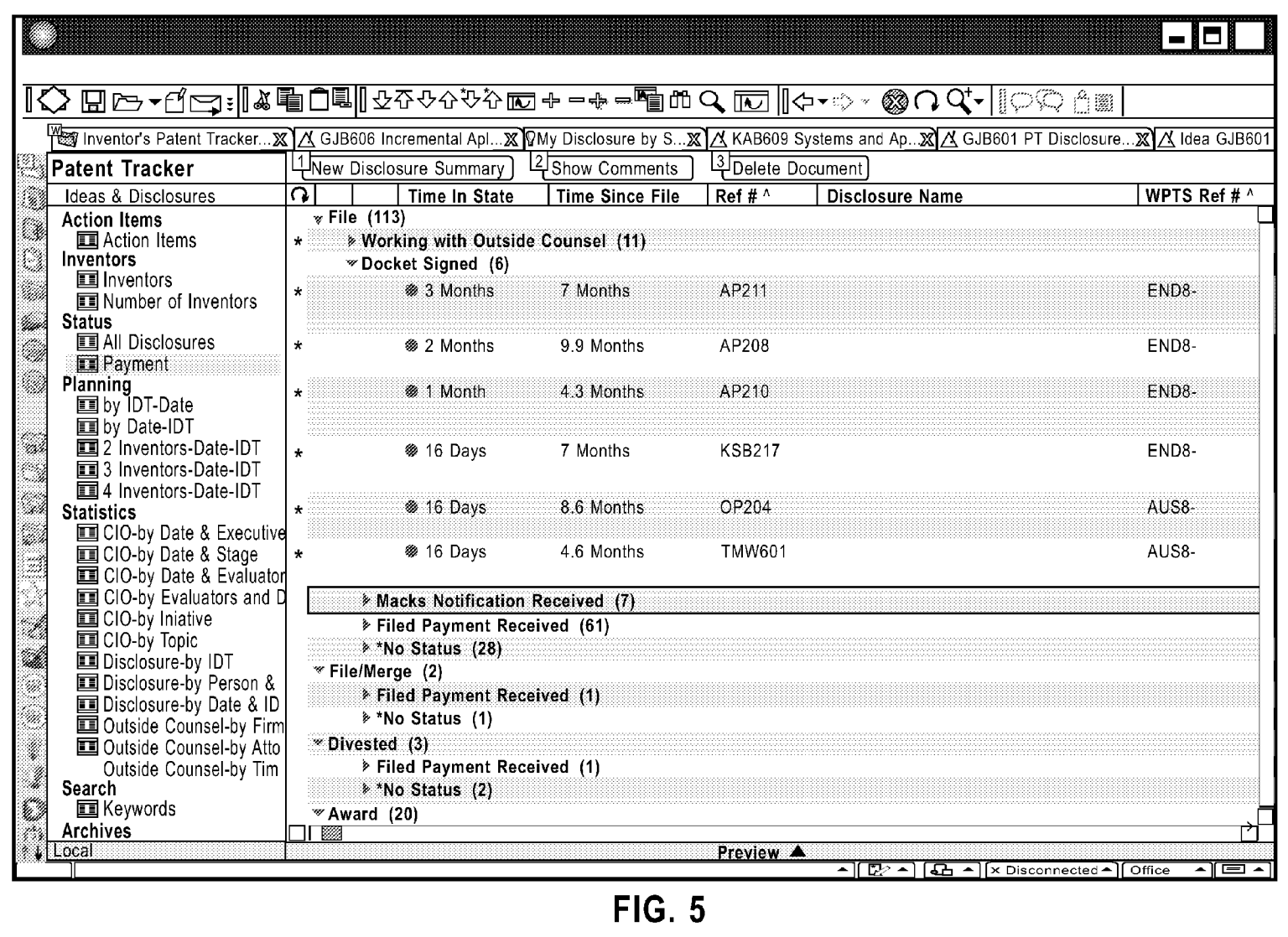

FIG. 5 illustrates a provision of payment status, as well as identification of state duration. This function permits the inventor to see whether they have been paid by the company for a given docket filing, and also illustrates the length of time that the disclosure has been in a given state. An embodiment of the invention permits the user to ensure proper payment by management, and the latter role permits the user to identify disclosures or dockets that may be overdue for certain actions.

Figure 6:
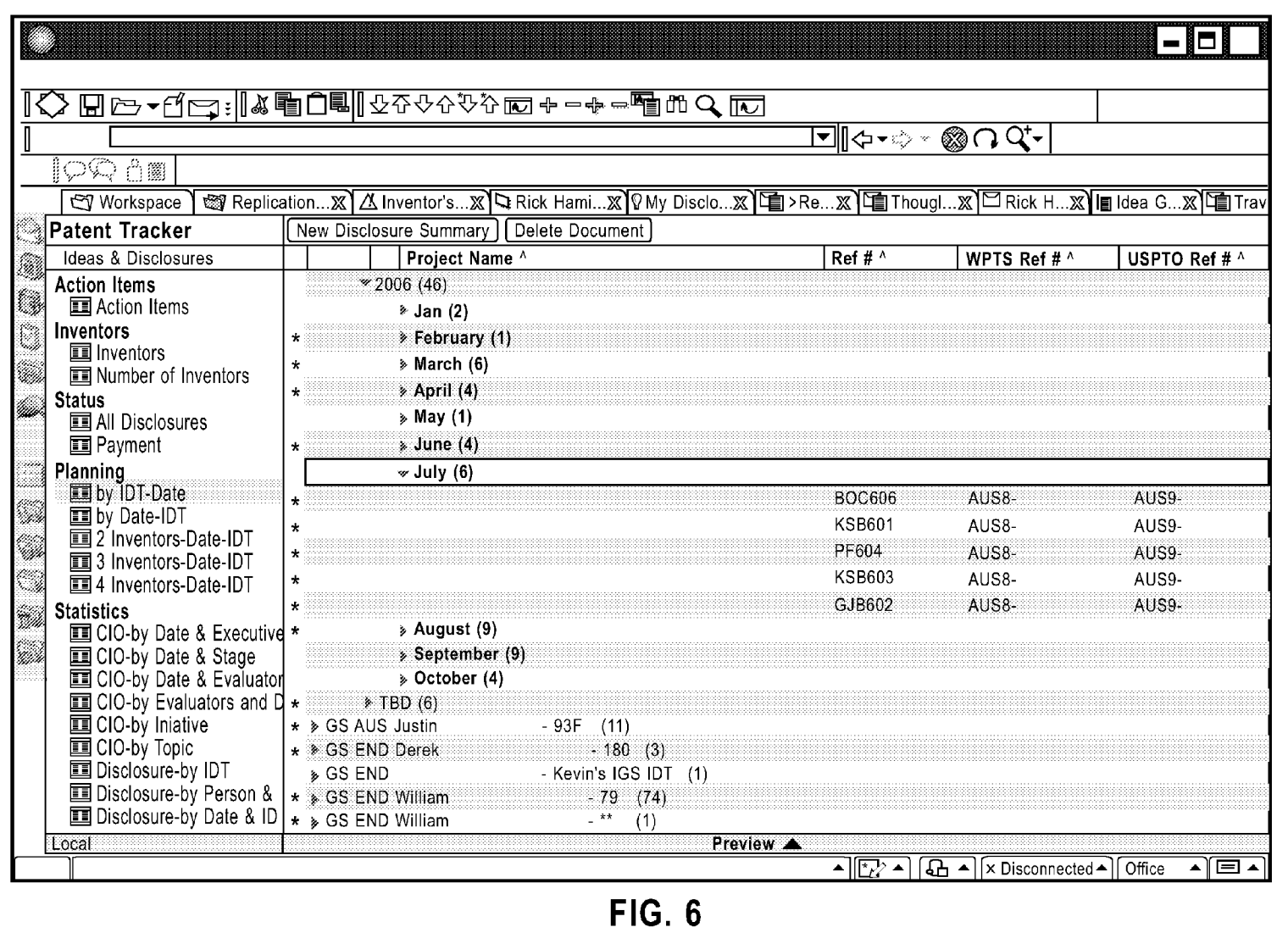

FIG. 6 illustrates planning features, from a perspective of review board dates. An embodiment of the invention allows the displayed data to be further characterized as a listing of reviewers of inventive submissions. This permits inventors both a historical record, and more importantly a view of upcoming boards with prioritization of the ideas under consideration for those dates. An embodiment of the invention allows ability to show disclosures in a way that shows those disclosures that are before a review board on a given month\year\date.

An embodiment of the invention allows past disclosures to be listed, with the outcome and associated tracking numbers listed.

An embodiment of the invention allows the displayed data to be further characterized and viewed as a date. An embodiment of the invention allows ideas to be moved to the top of the list based on a combination of strength and readiness. These parameters are as determined by the inventors, where strength represents inventor-perceived value to the company and readiness in an indicator of how close the idea is to final form and submission.

An embodiment of the invention promotes such ideas to the top of the list for a given Invention Disclosure Team (IDT) and facilitates an inventor's work flow management. An embodiment of the invention allows a user to view the rating system allows the user to tell which idea is closest to being ready and also has greatest value to the organization and effort can be focused. As a result, this embodiment can provide a planning mechanism that can go through an inventor submission to a review board.

Figure 7:
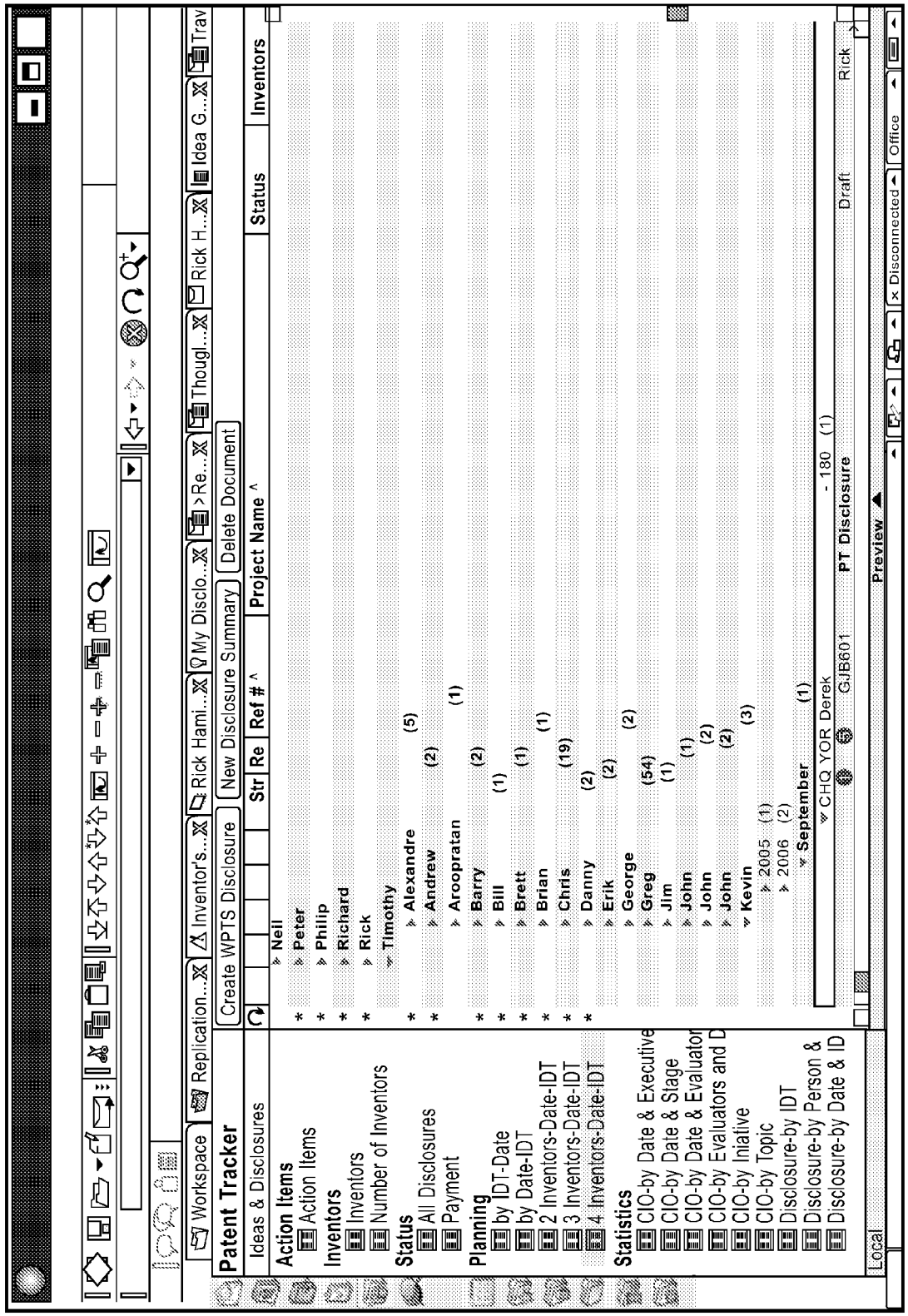
FIG. 7 illustrates a provision of inventor combination summaries according to an embodiment of the invention.

FIG. 7 illustrates a provision of inventor combination summaries according to an embodiment of the invention. An embodiment of the invention allows finding points of commonality for discussion. Points of commonality allow a user to look at those disclosures or ideas for which they are working on with one, two, or three other inventors which ensures time is optimized, and that ideas are relevant to members. This embodiment assists inventors to know where they can best spend their time and assists management with the review process.

Figure 8:
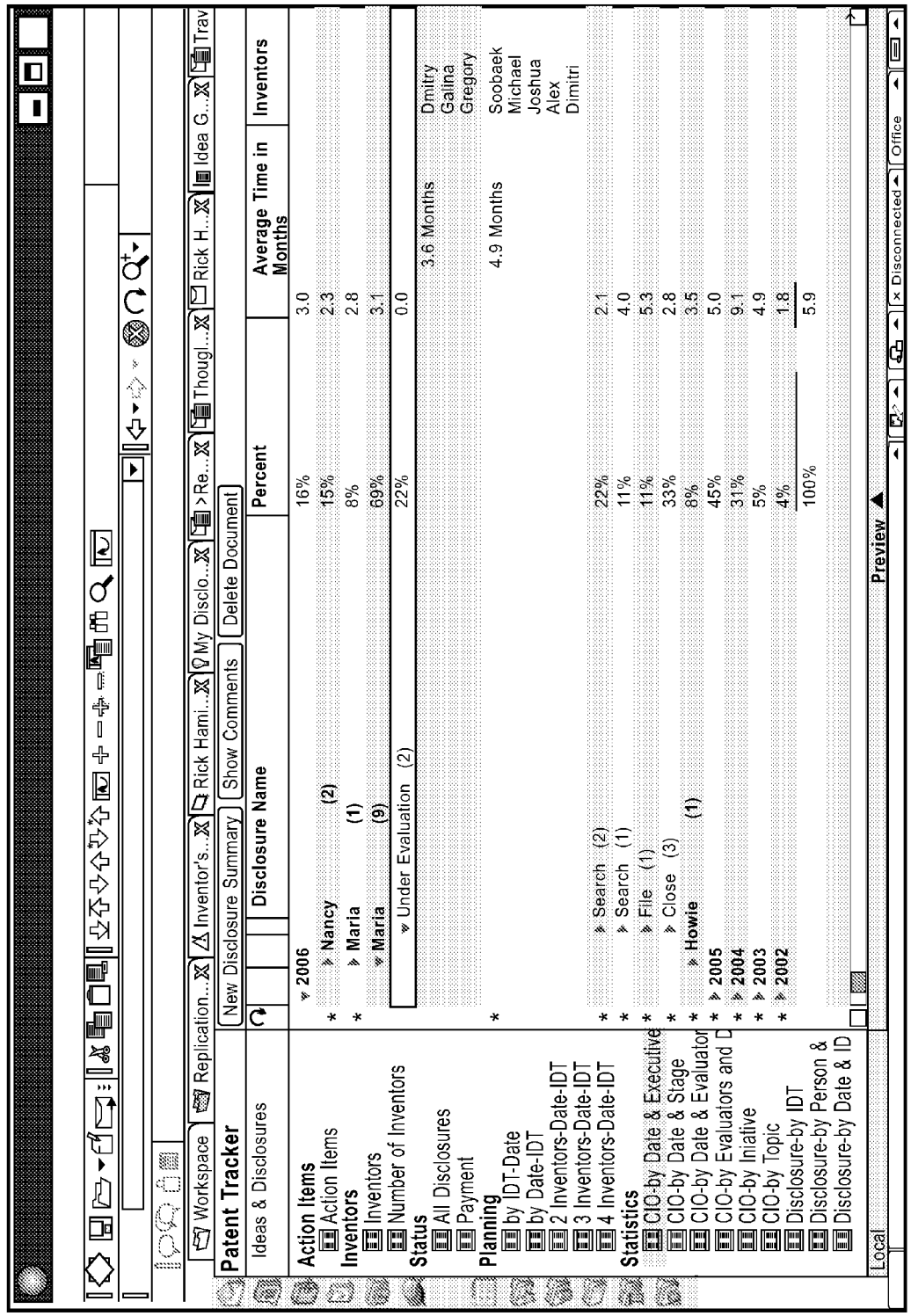
FIG. 8 illustrates a provision of disclosure breakouts by date and executive according to an embodiment of the invention.

FIG. 8 illustrates a provision of disclosure breakouts by date and executive. An embodiment of the invention allows the displayed statistical data to be further characterized as a business unit listing and responsible executive. An embodiment of the invention permits an executive to view the status of disclosures beneath a given line of business. Characterizing data as a business unit listing allows the tracking of the activities of employees within a given line of business. The embodiment can apply to business groups so that executive can see budget percentages based on a responsible executive.

Figure 9:
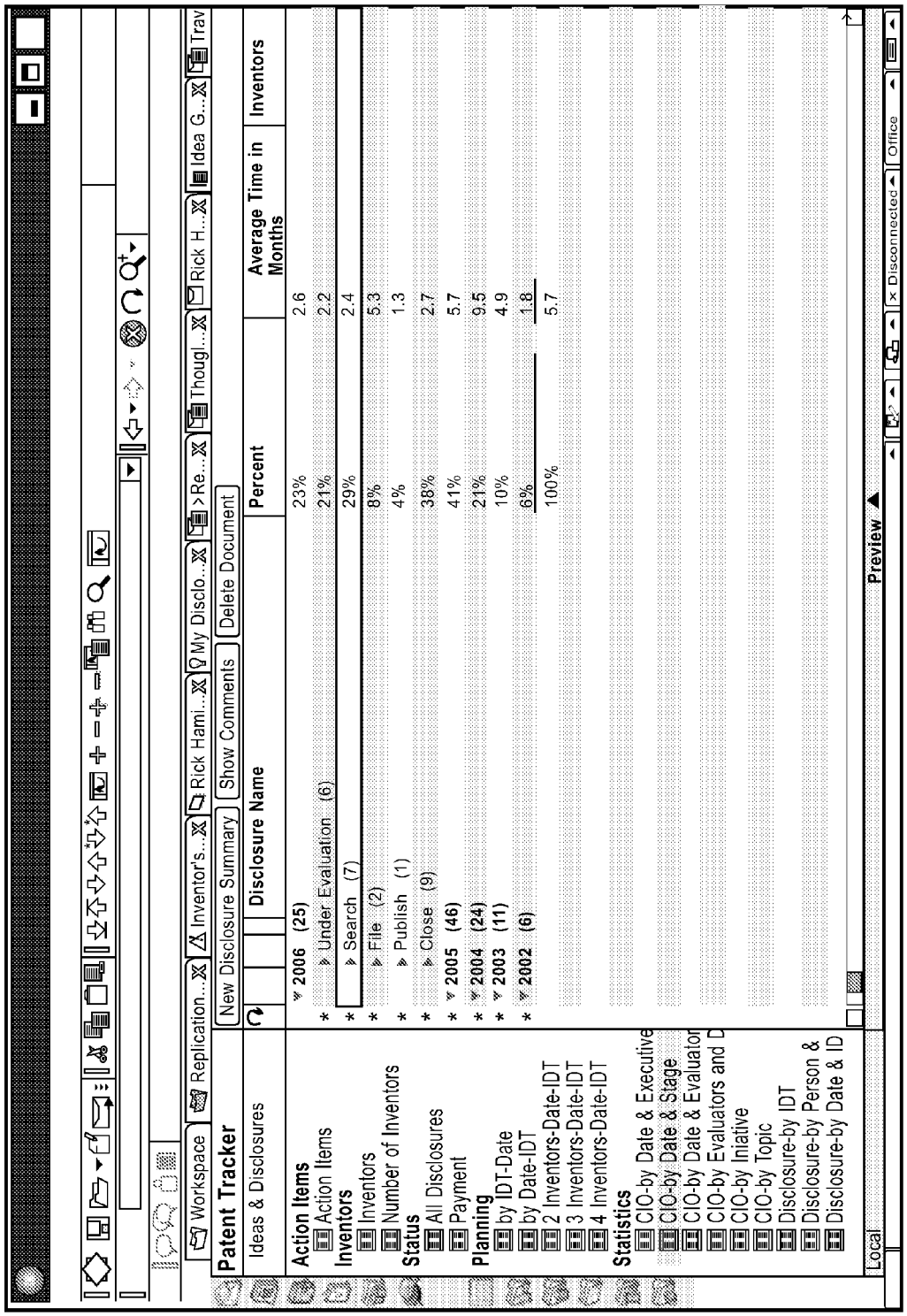
FIG. 9 illustrates a provision of disclosure breakouts by date and stage according to an embodiment of the invention.

FIG. 9 illustrates a provision of disclosure breakouts by date and stage according to an embodiment of the invention. Similarly, the disclosures and submissions for a broad organization can be viewed by stage of their progression through the review and docket preparation process which assists reporting and accurate knowledge of the innovation efforts by line of business.

FIG. 10 illustrates a provision of statistics for a given review board. According to an embodiment of the invention statistics for evaluation boards to be ascertained can be displayed. Statistics for review boards allows such evaluation boards to be managed and leveraged by management. Review boards have become more technology focused. Statistics on which evaluation boards are the most active would be useful to determine if those boards should be absorbed into similar boards or perhaps given higher workloads. A technology sub-focus could become a board all to itself (like a separate evaluation board/team from the network evaluation board/team) if there is enough interest in that technology from a patent perspective. An embodiment of the invention allows statistics to be viewed based on a particular review board, the classification, and dates.

Figure 11:
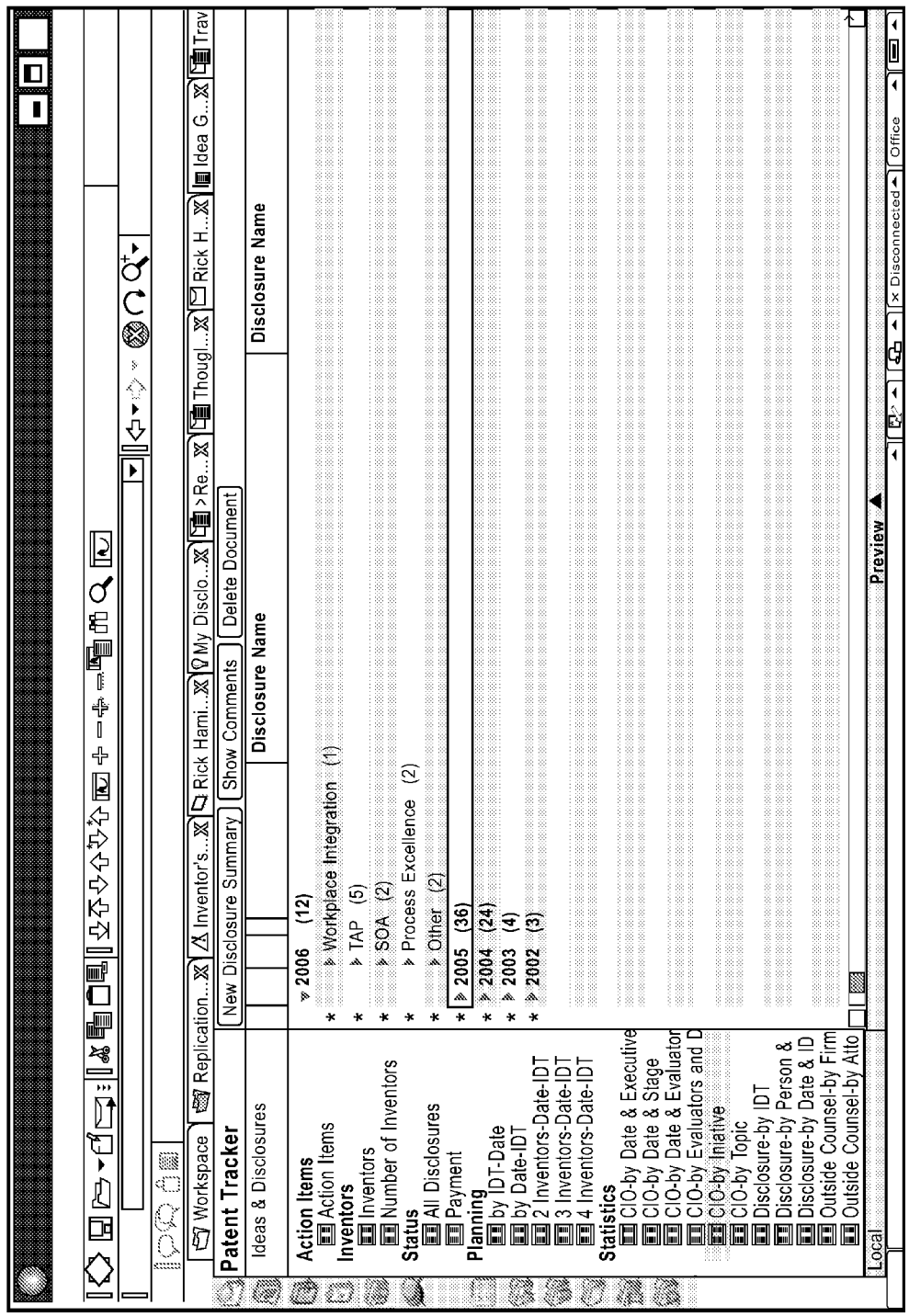
FIG. 11 illustrates a provision of disclosures by initiative according to an embodiment of the invention.

FIG. 11 illustrates a provision of disclosures by initiative. An embodiment of the invention allows the displayed statistical data to be characterized as an initiative. Statistical data characterized as an initiative allows users to display data based on a given focus areas.

Figure 12:
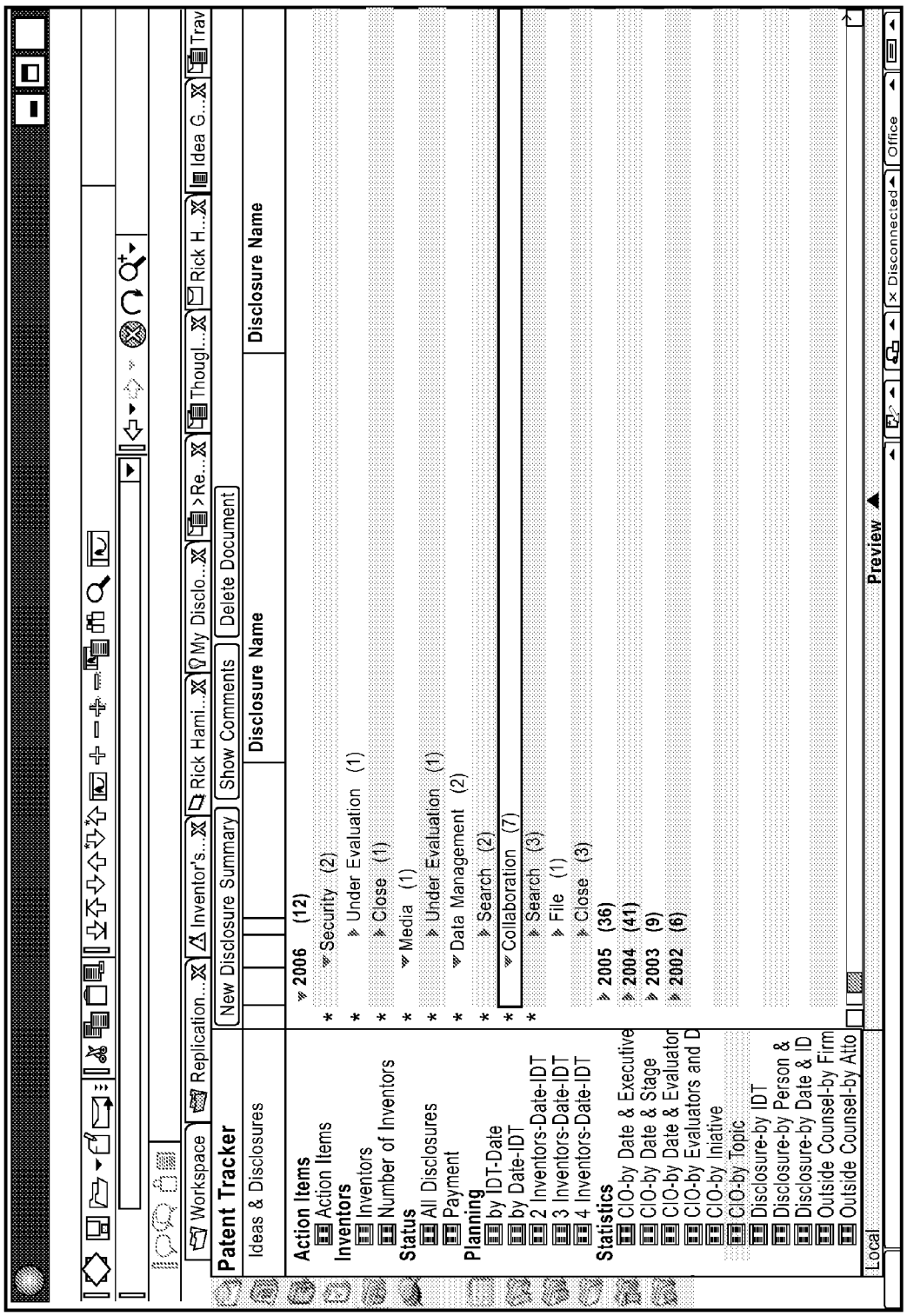
FIG. 12 illustrates a provision of disclosures by initiative according to an embodiment of the topic.

FIG. 12 illustrates a provision of disclosures by topic. An embodiment of the invention allows the displayed statistical data to be characterized as a topic. Statistical data characterized as an initiative allows users to display data based on a given focus areas.

Figure 13:
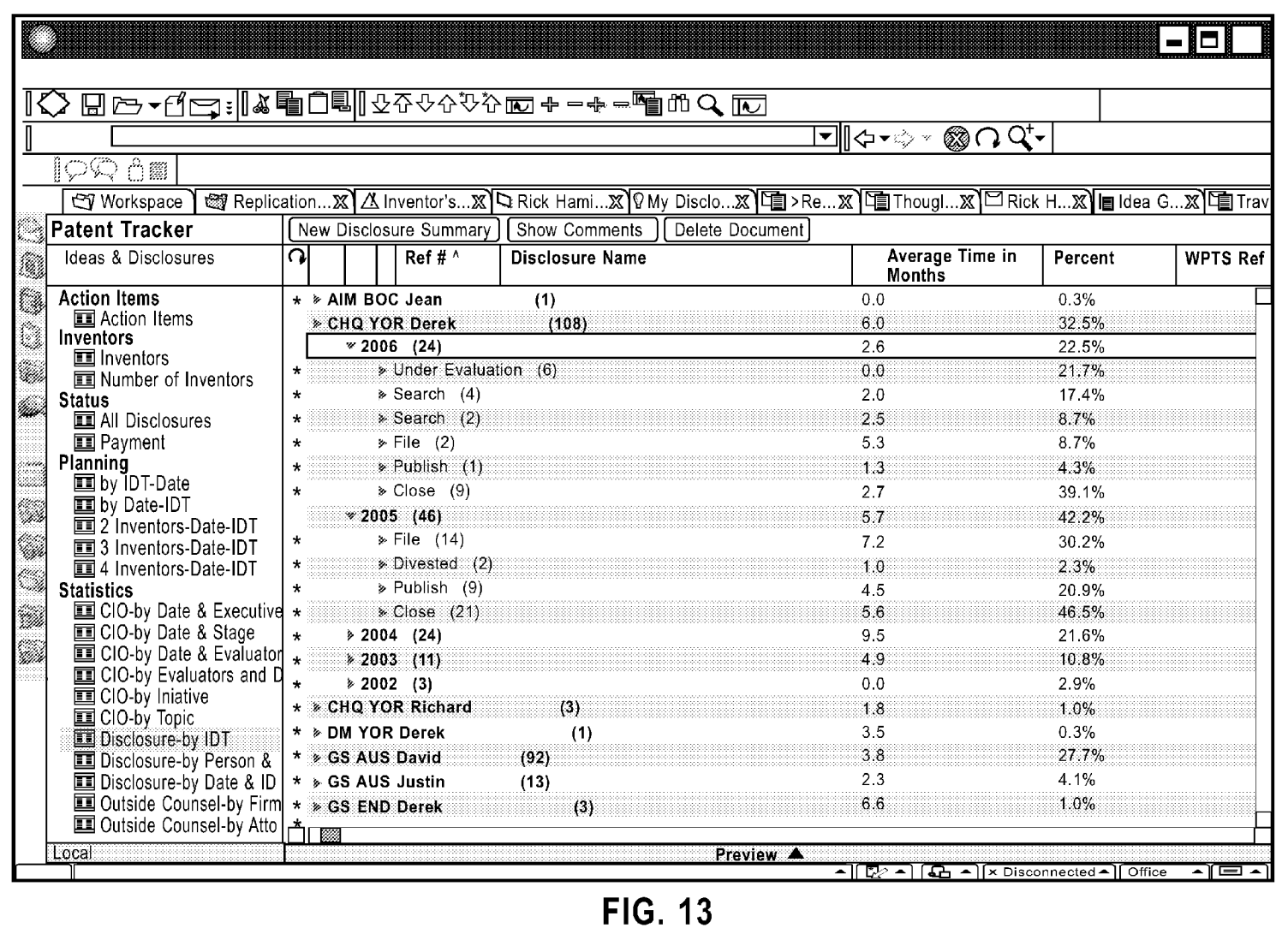

FIG. 13 illustrates a provision of statistics by IDT. A given IDT may be viewed for disclosure states associated with it. An embodiment of the invention allows portfolio managers to identify technology trends and abnormal evaluation standards so that corrective actions can be taken. An embodiment of the invention also allows for the identification of the IDT process review to ensure that high quality standards and processes are being met.

FIG. 14 illustrates a provision of statistics by person and IDT. An embodiment of the invention allows displayed data to aid businesses to find statistical irregularities, which may demonstrate that a review board or attorney with evaluations and final decisions.

FIG. 15 illustrates a provision of disclosures by date and IDT, for each inventor. An embodiment of the invention provides a historical trail of where a given user has submitted disclosures over the course of time. Such statistical data allows management to show personal contributions to the organization.

FIG. 16 illustrates a provision of an outside counsel rating system by Firm according to an embodiment of the invention. This permits inventors to rate outside counsel by firm on both technical proficiency and expediency, as a means of providing valuable feedback to in house counsel.

FIG. 17 illustrates a provision of an outside counsel rating system by individual counsel according to an embodiment of the invention. This permits inventors to rate outside counsel by counsel on both technical proficiency and expediency, as a means of providing valuable feedback to in house counsel.

FIG. 18 illustrates the submission of data. Inventor(s), scientist(s), and other professionals and end users populate metadata about a given idea or comment into the database. This results in an abstraction submission.

Inventor(s), scientist(s), engineer(s) and other professions populate metadata about a given idea. This embodiment provides a time line of an idea brainstorming session which may lead to an idea to be abandoned before submission or the idea's growth may lead to a invention disclosure and or a patentable invention. In an embodiment of the invention a unique codifier is given to ideas as they are conceived. These may either feature the idea originator's initials followed by a unique number, the initials of the person tasked with doing the initial write-up, or a three letter identifier associated with the technology focused upon in the invention. Again, the question of whose initials are used for tracking is less important than the fact that some unique identifier is assigned to an idea early.

In addition, an embodiment of the invention may accept inputs and updates from other data sources. By importing data from other databases and data sources a professionals workload is mitigated and as much automation is introduced as possible. Likewise, an embodiment of the invention may input data from other databases to import names of law firms and other such information to the tracking records.

Elements that will be claimed as part of this invention include future enhancements to the database. In an embodiment of the invention a Blog is implemented. The use of an weblog ("blog") is prescribed to assist in monitoring development of a given idea. In particular, the use of blogs permits a trace to be constructed to prove inventorship and dates of innovative additions to an idea. A definitive, unalterable time stamp would be provided on a host server, and a form of authentication would be required to provide such a legal record of who had added any particular enhancement to a given idea during its development. The blog would be open to a brainstorming group, and would provide the means necessary to determine true inventorship at the time of docket filing.

An embodiment of the invention also facilitates an Wiki. The use of an "wiki" can be used to provide a forum for definition of the patentable idea. The historical trail of the wiki could again be used to ascertain inventorship, and even as the idea reaches final form in this semi-private electronic setting, the contributions of each "potential inventor" could again be checked before docket filing.

An embodiment of the invention can provide flags and alerts regarding which employees have not filed idea disclosures in a given time period. Such persons could be targeted to develop new ideas or inventions.

In another embodiment of the invention when inventors fill out the information at the end of the disclosure, this information could be used to rate to item when it is sent to the patent office In this respect, predictions may be made of when office actions and/or issuances might be expected.

For organizations with master inventor (and analogous) classifications, an embodiment of the invention can track whether an individual has met such criteria for master inventorship and notification correspondingly may be sent to appropriate party for nomination.

Figure 19:
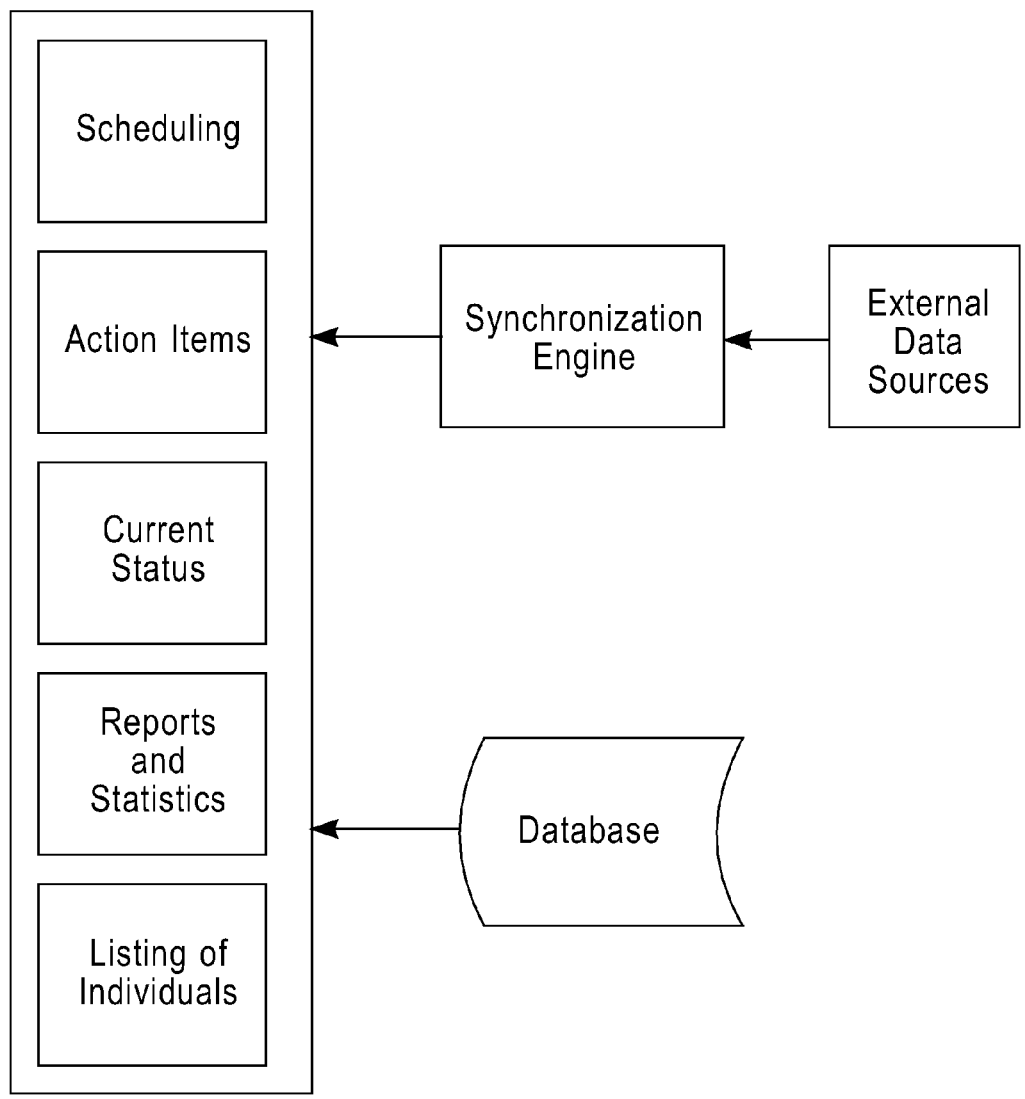
FIG. 19 illustrates input of data sources from an internal database(s) and external data source(s) according to an embodiment of the invention.

FIG. 19 illustrates input of data sources from an internal database(s) and external data source(s) containing scheduling data, statistical data, action item data, current status data and listing of individuals.

Figure 20:
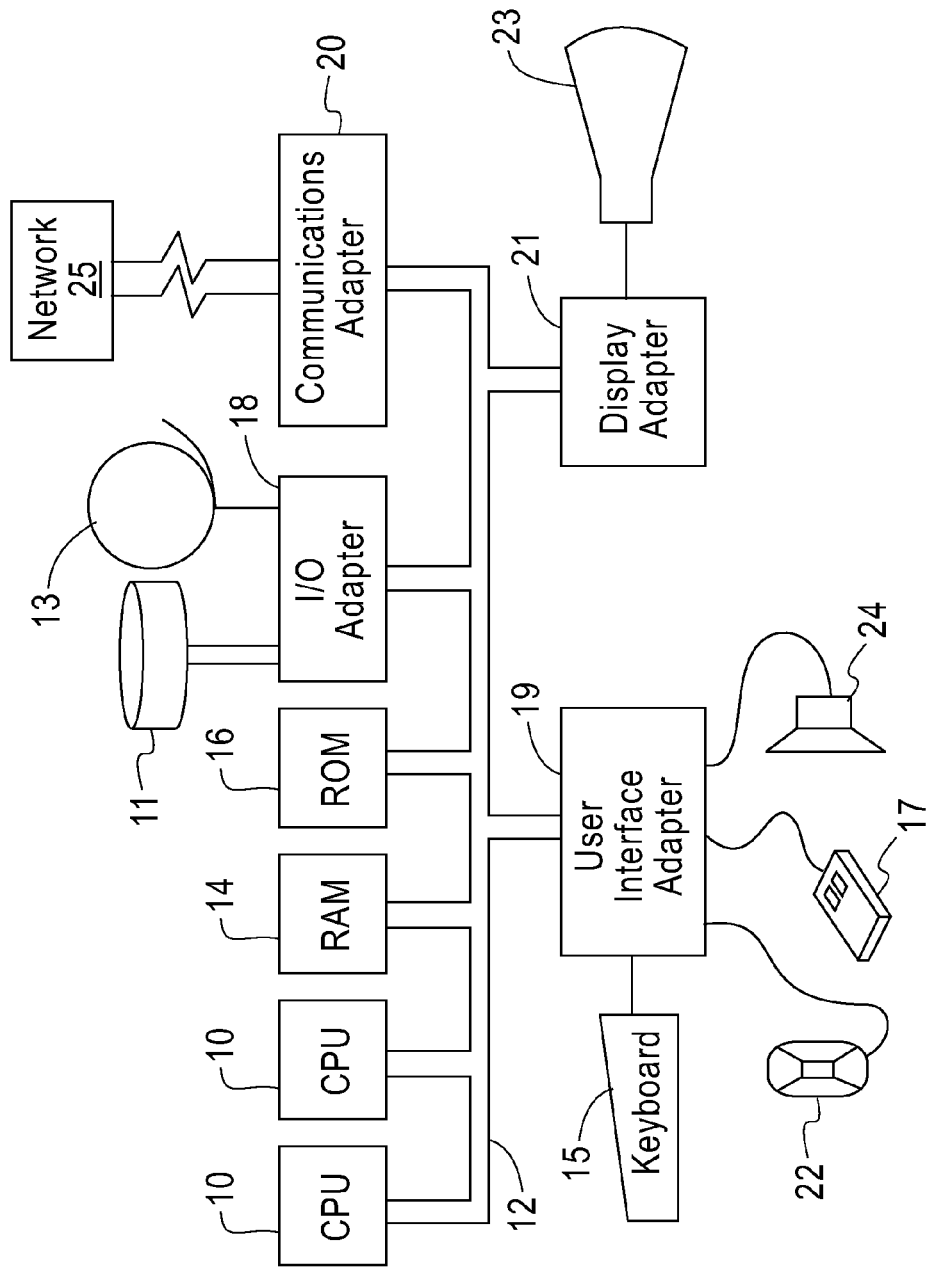
FIG. 20 illustrates a hardware environment according to an embodiment of the invention.

A representative hardware environment for practicing the embodiments of the invention is depicted in FIG. 20. Data is accessed from a data repository source 11 via a data connection 12. The data accessed from the data repository is then displayed 23. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Some features of the tracking system are not necessarily coded, but rather procedural. A unique codifier is given to ideas as they are conceived. These may either feature the idea originator's initials followed by a unique number, the initials of the person tasked with doing the initial write-up, or a three letter identifier associated with the technology focused upon in the invention. Again, the question of whose initials are used for tracking is less important than the fact that some unique identifier is assigned to an idea early. In addition, the PT accepts inputs and updates from the existing WPTS data. By importing data from WPTS, the inventor's workload is mitigated and as much automation is introduced as possible. Likewise, the PT draws from the IP&L Control Database to import names of law firms and other such information to the tracking records. This embodiment of the invention allows for synching with other databases and information sources.

As will be appreciated by one skilled in the art, the present invention may be embodied as a system, method or computer program product. Accordingly, the present invention may take the form of an entirely hardware embodiment or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The block diagram in the FIG. 20 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the provided illustrative examples are by no means exhaustive of the many possible uses for my disclosure. From the foregoing description, one skilled in the art can easily ascertain the essential characteristics of this disclosure and, without departing from the spirit and scope thereof, can make various changes and modifications of the disclosure to adapt it to various usages and conditions.

It is to be understood that the present disclosure is not limited to the embodiments described above, but encompasses any and all embodiments within the scope of the following claims:

What is claimed is:

1. A method for displaying information from a database, said method comprising:
    accessing a data repository via a data connection;
    displaying data from said data repository with an interface, the data including a list of inventor ideas;
    allowing said displayed data to be characterized as scheduling and statistical data;
    receiving a strength parameter and a readiness parameter from at least one inventor, the strength parameter representing an inventor-perceived value to a company of the inventor of at least one idea of the inventor ideas, and the readiness parameter indicating how close the idea is to final form and submission;
    moving the idea within the list with a processor, the idea moved within the list based on the strength parameter and the readiness parameter; and
    wherein said displaying of the data includes displaying invention disclosures that are before invention evaluation boards on a given month, year, and date, the invention evaluation boards including reviewers of invention disclosures.

2. The method of claim 1, further comprising allowing said displayed data to be further characterized as:
    an action item to be performed by at least one of the inventor and a co-inventor;
    an owner of said action item;
    an assignment of said action item; a due date of said action item;
    a current status of an idea submission; and
    a listing of individuals.

3. The method of claim 2, further comprising allowing said displayed current status data to be further characterized as a stage.

4. The method of claim 2, further comprising allowing said displayed listing of individuals to be further characterized as:
    a number of individual group members; and
    an abstraction submission.

5. The method of claim 1, further comprising allowing said scheduling data to be further characterized as:
    a listing of reviewers; and
    a date.

6. The method of claim 1, further comprising allowing said displayed statistical data to be further characterized as:
    a responsible executive;
    a date;
    an initiative;
    a topic;
    a stage;
    a submission; and
    a listing of reviewers.

7. The method of claim 1, further including:
    displaying workloads of the invention evaluation boards; and
    determining, based on the workloads of the invention evaluation boards, whether to perform one of:
    combining a select invention evaluation board with at least one additional invention evaluation board to form a single invention evaluation board;
    dividing the select invention evaluation board into at least two separate invention evaluation boards; and
    increasing a workload of the select invention evaluation board.

8. The method of claim 1, further including:
    flagging at least one employee in the data repository that has not filed an invention disclosure within a predetermined time period; and
    sending an alert to a user, the alert indicating that the employee has not filed an invention disclosure within the predetermined time period.

9. The method of claim 1, wherein said displaying of the data includes displaying outside counsel ratings, the outside counsel ratings including:
    ratings of outside counsel firms on technical proficiency and expediency, and
    ratings of individual outside counsel attorneys on technical proficiency and expediency.

10. The method of claim 1, further including:
    inputting at least one comment into the data repository, the comment including at least one of a weblog entry and a wiki entry;
    inputting an author into the data repository for each comment;
    inputting a time stamp into the data repository for each comment; and
    determining inventorship and a date of innovation for an inventor idea based on the comment, the author, and the time stamp.

11. A system for displaying information from a database, said system comprising:
    a data repository to store database information, the database information including a list of inventor ideas, strength parameters from inventors, and readiness parameters from the inventors, the strength parameters representing inventor-perceived values of the inventor ideas to a company of the inventors, and the readiness parameters indicating how close the inventor ideas are to final form and submission;

an interface operative to display said database information as scheduling, statistical, and current status data, said interface operative to display the list of inventor ideas;

a processor for moving at least one idea of the inventor ideas within the list based on the strength parameters and the readiness parameters;

a data connection from said data repository to said interface; and wherein said interface displays invention disclosures that are before invention evaluation boards on a given month, year, and date, the invention evaluation boards including reviewers of invention disclosures.

12. The system of claim 11, wherein said interface is further operative to display:
an action item; and
a listing of individuals.

13. The system of claim 11, wherein said interface displays workloads of the invention evaluation boards for determining whether to perform one of:
combining a select invention evaluation board with at least one additional invention evaluation board to form a single invention evaluation board;
dividing the select invention evaluation board into at least two separate invention evaluation boards; and
increasing a workload of the select invention evaluation board.

14. The system of claim 11, wherein said processor:
flags at least one employee in the data repository that has not filed an invention disclosure within a predetermined time period; and
sends an alert to a user, the alert indicating that the employee has not filed an invention disclosure within the predetermined time period.

15. The system of claim 11, wherein the database information includes outside counsel ratings, the outside counsel ratings including:
ratings of outside counsel firms on technical proficiency and expediency, and
ratings of individual outside counsel attorneys on technical proficiency and expediency.

16. The system of claim 11, wherein the database information includes at least one comment, the comment including at least one of a weblog entry and a wiki entry, an author of each comment, and a time stamp of each comment, and
wherein said processor determines inventorship and a date of innovation for an inventor idea based on the comment, the author, and the time stamp.

17. A non-transitory program storage device readable by a machine, tangibly embodying a program of instructions executable by the machine to perform a method for displaying information from a database, the method comprising:
accessing a data repository via a data connection;
displaying data from said data repository with an interface, the data including a list of inventor ideas;
allowing said displayed data to be characterized as a scheduling data, statistical data, and action item;
receiving a strength parameter and a readiness parameter from at least one inventor, the strength parameter representing an inventor-perceived value to a company of the inventor of at least one idea of the inventor ideas, and the readiness parameter indicating how close the idea is to final form and submission;
moving the idea within the list with a processor, the idea moved within the list based on the strength parameter and the readiness parameter;
wherein said displaying of the data includes displaying invention disclosures that are before invention evaluation boards on a given month, year, and date, the invention evaluation boards including reviewers of invention disclosures.

18. The program storage device of claim 17, further including:
displaying invention disclosures that are before invention evaluation boards on a given month, year, and date, the invention evaluation boards including reviewers of invention disclosures;
displaying workloads of invention evaluation boards; and
determining, based on the workloads of the invention evaluation boards, whether to perform one of:
combining a select invention evaluation board with at least one additional invention evaluation board to form a single invention evaluation board;
dividing the select invention evaluation board into at least two separate invention evaluation boards; and
increasing a workload of the select invention evaluation board.

* * * * *